UNITED STATES PATENT OFFICE.

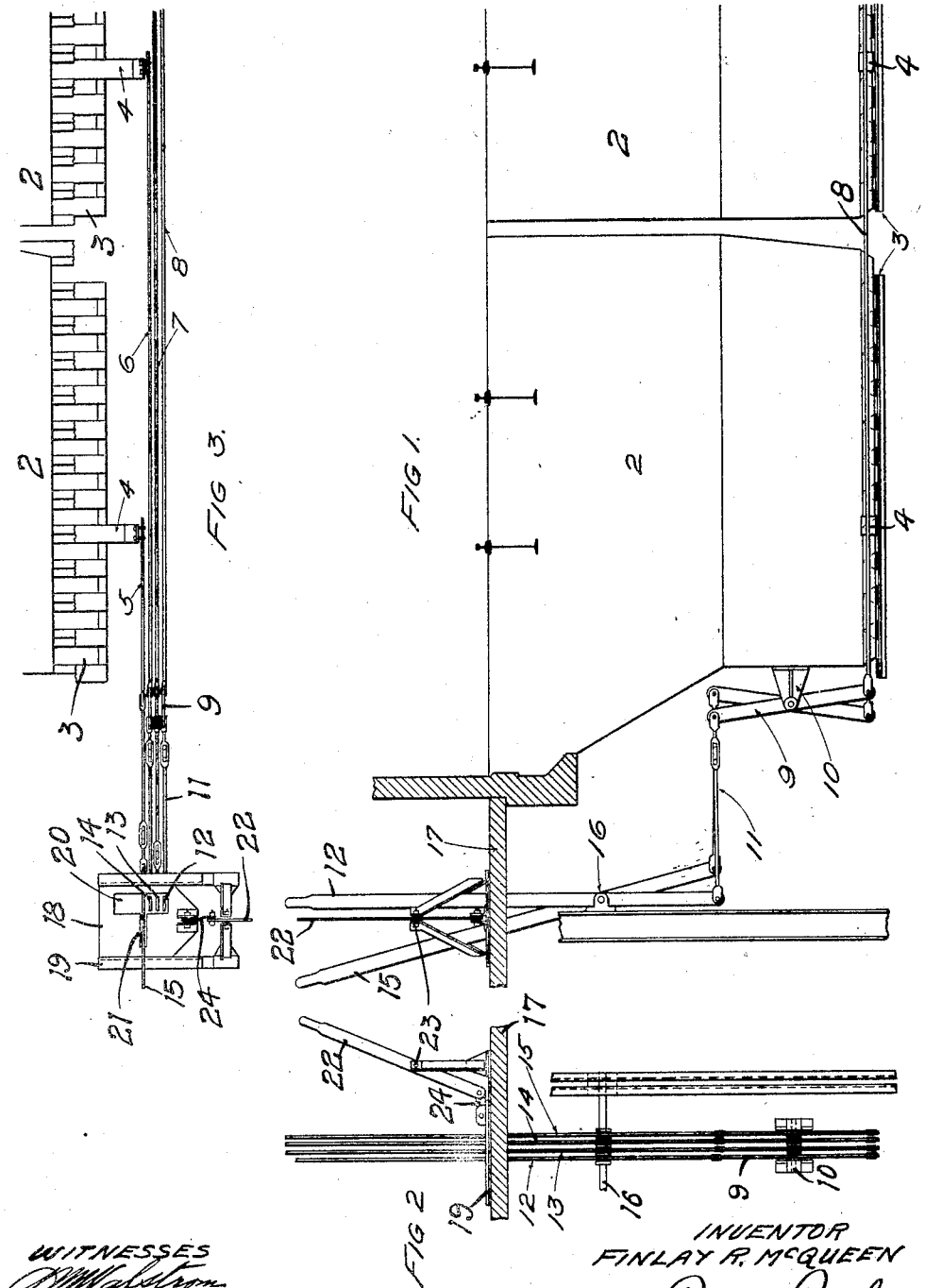

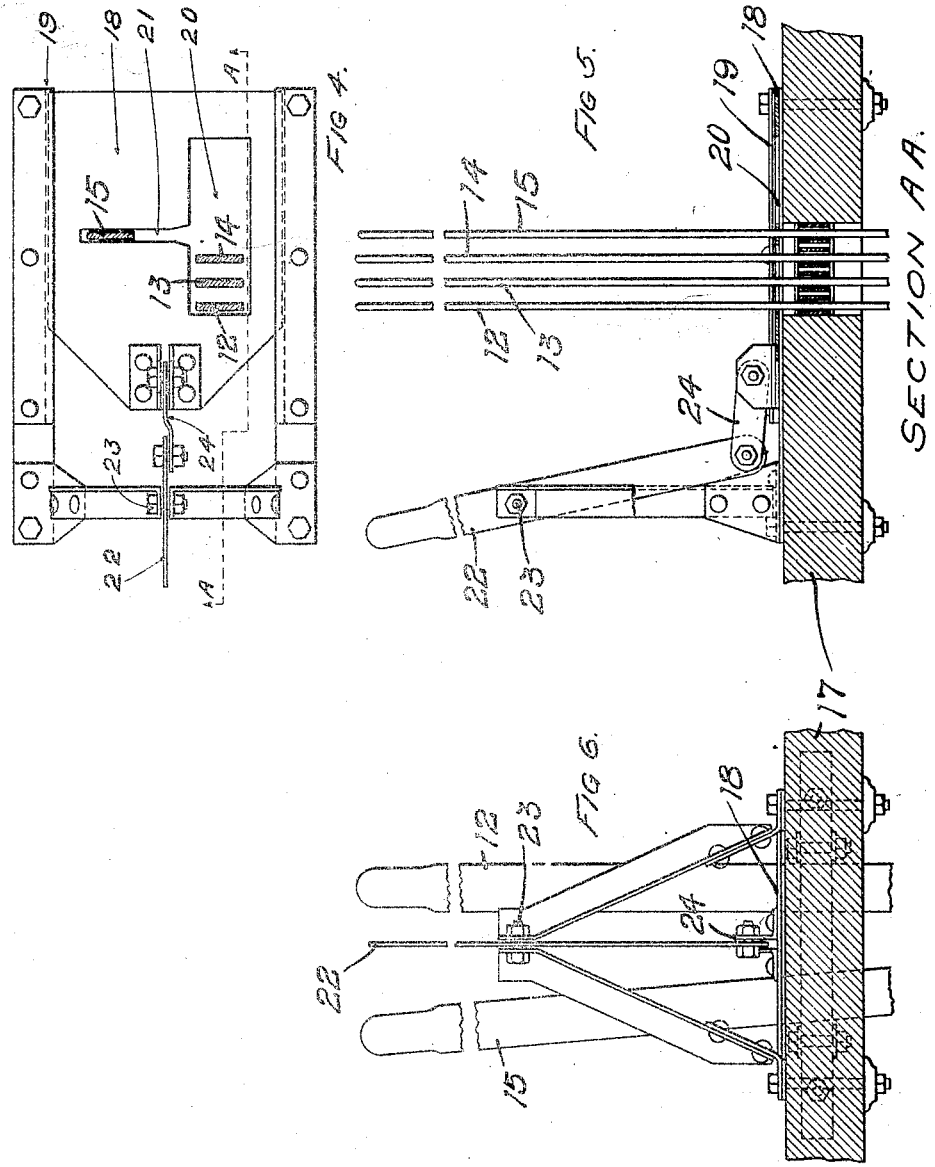

FINLAY R. McQUEEN, OF MINNEAPOLIS, MINNESOTA.

CONTROLLING DEVICE FOR GRANARIES AND BINS.

No. 924,921.　　　　Specification of Letters Patent.　　Patented June 15, 1909.

Application filed January 11, 1908. Serial No. 410,369.

*To all whom it may concern:*

Be it known that I, FINLAY R. McQUEEN, of Minneapolis, Hennepin county, Minnesota, have invented certain new and useful Improvements in Controlling Devices for Granaries and Bins, of which the following is a specification.

The object of this invention is to provide a means for controlling the operating levers for grain bin slides, the apparatus shown herein being for the same purpose as the device illustrated and described in my companion application "A" herewith, filed Jan. 11, 1908, Serial No. 410,368, and being of more simple construction and easier of installation.

My invention consists generally in various constructions and combinations, all as hereinafter described and particularly pointed out in the claims.

In the accompanying drawings, forming part of this specification, Figure 1 is a sectional view illustrating the application of my invention to a bin. Fig. 2 is a detail sectional view of the same. Fig. 3 is a plan view illustrating the connection of the levers with the bin slides. Fig. 4 is a detail sectional view showing the device for locking the levers against operation. Fig. 5 is a sectional view on the line A—A of Fig. 4. Fig. 6 is an edge view of the operating lever by means of which the locking device is controlled.

In the drawing, 2 represents the bins having slides 3 connected at 4 with operating rods 5, 6, 7 and 8. Bars 9 are pivotally supported at points intermediate to their ends in a bracket 10 and pivotally connected at their lower ends to said rods respectively. The upper ends of the bars are connected by rods 11 with a series of levers 12, 13, 14 and 15. These levers are pivotally mounted at 16 and extend up through the floor 17 in position to be grasped and operated by the attendant. A plate 18 is slidable in guides 19 on said floor and has an opening 20 through which the levers extend, said opening being of sufficient width to receive the levers but too narrow to permit them to be oscillated therein except when opposite a slot 21 which communicates at one end with the opening 20 and extends into the plate 18 to a point near one edge. The opening is of sufficient length to allow the plate 18 to be reciprocated and adjust the slot 21 opposite any one of the levers but only one of them at a time, and consequently one of said levers may be operated to open the bin slide while all of the others are locked against oscillation. A lever 22 is pivoted at 23 and connected by a link 24 with the plate 18. The oscillation of the lever 22 will reciprocate the plate 18, move the slot 21 past the levers and permit any one of them to be operated to open the slide.

I have shown four levers, but a greater or less number may be employed according to the number of bin slides.

I claim as my invention:

1. The combination, with two or more bins having discharge openings and slides therefor, of oscillating levers connected with slides and arranged in a group side by side, and movable means having an opening of sufficient length to receive the oscillating ends of all of said levers and said opening being of insufficient width to allow oscillation of said levers in said opening, and said opening having an off-set adapted to receive the operating ends of said levers, one at a time when said off-set is adjusted opposite a lever by the movement of said means, substantially as described.

2. The combination, with two or more bins having discharge openings and slides therefor, of operating levers connected with said slides, means arranged in the path of said levers for preventing oscillation thereof, said means having an opening therein adapted to receive said levers one at a time, and means for moving said oscillation preventing means past said levers to render them operative or inoperative, substantially as described.

3. The combination, with two or more grain bins having discharge openings and slides therefor, of oscillating operating levers connected with said slides, a sliding plate having an opening to receive the ends of said levers said openings extending at right angles to the direction of movement of said levers, said plate having means whereby one of said levers may be operated at a predetermined point in the movement of said plate levers to open its slide while all the other levers are locked against such movement, and means for operating said sliding plate 4. The combination, with two or more bins having discharge openings and slides therefor, of operating levers connected with said slides, a sliding plate, guides wherein said plate is slidable, a lever having a pivotal connection with said plate for operating the same, said plate having an elongated opening therein adapted to receive the ends of said operating levers and said plate also having a slot communicating with said opening and of sufficient width to receive said levers one at a time, and said slot being moved successively past several levers by the operation of said plate.

In witness whereof, I have hereunto set my hand this 4th day of December, 1907.

FINLAY R. McQUEEN.

Witnesses:
RICHARD PAUL,
J. A. BYINGTON.